(12) United States Patent
Henriksson (10) Patent No.: US 7,062,235 B2
(45) Date of Patent: Jun. 13, 2006

(54) TESTING OF A RADIO TRANSCEIVER

(75) Inventor: Markku Henriksson, Oulu (FI)

(73) Assignee: Nokia Corporation, Espoo (FI)

( * ) Notice: Subject to any disclaimer, the term of this patent is extended or adjusted under 35 U.S.C. 154(b) by 567 days.

(21) Appl. No.: 10/008,435

(22) Filed: Nov. 13, 2001

(65) Prior Publication Data

US 2002/0042894 A1    Apr. 11, 2002

Related U.S. Application Data (63) Continuation of application No. PCT/FI00/00479, filed on May 29, 2000.

(30) Foreign Application Priority Data

Jun. 3, 1999    (FI) .................................... 991268

(51) Int. Cl.
*H04B 17/00*    (2006.01)

(52) U.S. Cl. ............................... 455/115.2; 455/115.1; 455/126

(58) Field of Classification Search .. 455/115.1–115.2, 455/63.1, 67.11–67.16, 69, 126; 370/243
See application file for complete search history.

(56) References Cited

U.S. PATENT DOCUMENTS

| | | | |
|---|---|---|---|
| 4,949,090 A * | 8/1990 | Tamii et al. ................. | 342/173 |
| 5,337,316 A | 8/1994 | Weiss et al. | |
| 5,457,812 A * | 10/1995 | Siira et al. ................ | 455/67.14 |
| 5,521,904 A * | 5/1996 | Eriksson et al. ............ | 370/249 |
| 5,574,981 A * | 11/1996 | Ahonen .................... | 455/67.14 |
| 5,594,950 A * | 1/1997 | D'Amico et al. ......... | 455/67.11 |
| 5,754,560 A * | 5/1998 | Nousiainen et al. ........ | 714/716 |
| 5,883,882 A * | 3/1999 | Schwartz .................... | 370/243 |
| 6,122,505 A * | 9/2000 | Genell et al. ............... | 455/423 |
| 6,208,621 B1 * | 3/2001 | Ducaroir et al. ............ | 370/241 |
| 6,505,041 B1 * | 1/2003 | Borgstrand ................. | 455/423 |

FOREIGN PATENT DOCUMENTS

| | | |
|---|---|---|
| DE | 19823523 | 8/1999 |
| EP | 0715424 | 6/1996 |
| EP | 0884862 | 12/1998 |
| EP | 0884863 | 12/1998 |
| WO | WO 99/50973 | 10/1999 |

* cited by examiner

*Primary Examiner*—Curtis Kuntz
*Assistant Examiner*—Matthew C. Sams
(74) *Attorney, Agent, or Firm*—Squire, Sanders & Dempsey LLP (57) ABSTRACT

The objective of this invention is to provide a test procedure that enables testing of not only the transceiver but also of the cable connecting the transmitters and receivers to the duplex filter and the duplex filter itself. The invention is based on the idea of utilizing the fact that the frequency response of the filter in the duplex filter transmission branch and that of the filter in the reception branch partially overlap in the stop band. This makes it possible to use the same stop band frequency in test transmission and test reception. On the transmitter, the test signal frequency ($f_{TEST}$) is adjusted so as to fall in between the system reception band (RX) and the transmission band (TX). The receiver reception frequency is shifted to the same frequency between the reception and transmission frequency bands to which the transmitter has been adjusted. This will provide a test signal that is sufficiently weak to satisfy the antenna interface requirements, but still strong enough to remain above the sensitivity threshold of the receiver despite the attenuation in the TX filter section of the duplex filter (A dB) and the attenuation in the RX filter section of the duplex filter. In this way, it is possible to have the receiver receive the test signal transmitted by the transmitter without any additional components being required.

13 Claims, 5 Drawing Sheets

TESTING OF A RADIO TRANSCEIVER

This application is a continuation of international application Ser. No. PCT/FI00/00479, filed May 29, 2000.

FIELD OF THE INVENTION

The present invention relates to the testing of radio components in a transceiver in a situation where the transmitter and receiver are connected to a common antenna via a duplex filter. More specifically, the invention relates to testing the performance of the cable connecting the radio transmitter to the duplex filter, the cable connecting the radio receiver to the duplex filter, and that of the duplex filter itself.

BACKGROUND

Radio-frequency self-diagnosis is a method commonly used in radio systems, where the transmitter and receiver are connected to a common antenna via a duplex filter. Self-diagnosis is effected by having the transmitter send a test signal on the transmission frequency which is then converted into the reception frequency and fed into the receiver. The test signal may contain a known bit pattern that can be used to infer whether the transmitter and receiver are operating error-free. For the diagnosis, a separate test loop connecting the transmitter to the receiver may be used, or the test loop may include parts of the transmitter and receiver branch signal path.

Figure 1:
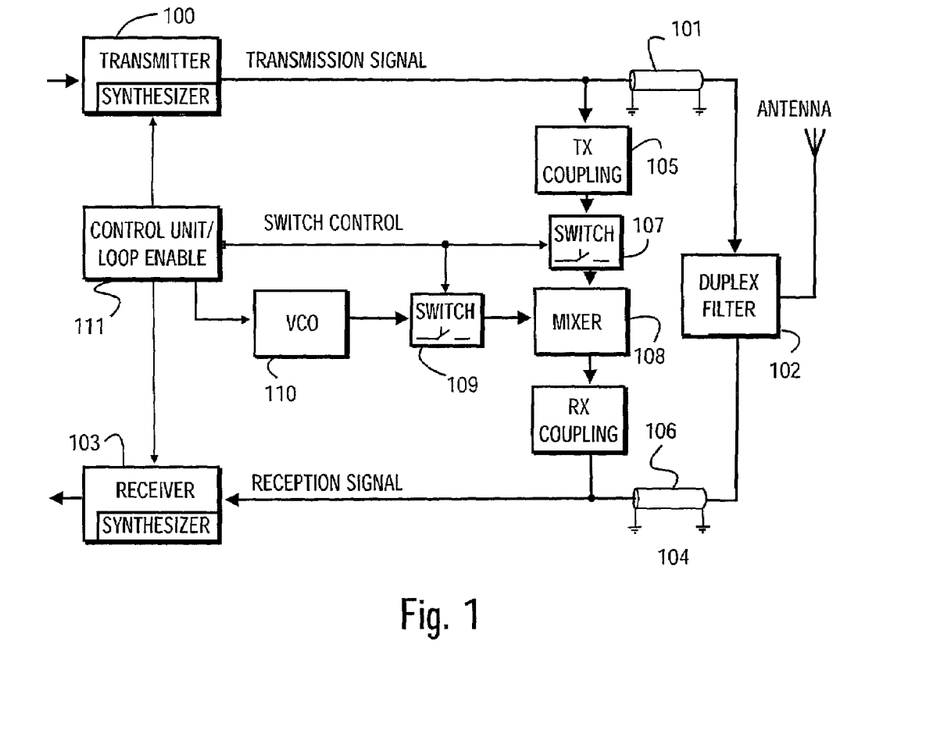
FIG. 1 shows a transceiver test loop circuit.

FIG. 1 shows one known circuit for carrying out the test. This type of connection and its variations have been described in patents, such as U.S. Pat. No. 5,337,316, Weiss et al. The transceiver unit includes the transmitter 100, connected by the cable 101 to the duplex filter 102, as well as the receiver 103, connected to the duplex filter by the cable 104. The transmitter and receiver may be tuned to different frequencies, therefore their local oscillator frequencies are generated using the frequency synthesizer. The foregoing represents basic expertise in the field. The test loop is formed by having TX coupling 105 sample the test signal generated by the transmitter and fed to the transmitter branch, typically containing a known bit pattern. The coupling 105 may be a directional coupler that is used to sample the desired output power from the transmitter output power. The test signal is led through the switch 107 to the mixer 106, where the frequency is converted from the transmission frequency into the reception frequency. Then, the frequency-converted signal passes to the directional coupler 106 in the reception branch, to be relayed to the receiver 103. Thus, the test loop consists of the transmitter, directional coupler 107, switch 105, mixer 108, directional coupler 106, and the receiver.

One embodiment of the circuit in accordance with the said US patent is that the transmitter's transmission frequency and the receiver's reception frequency are set to an identical level. Then, the mixer in the test loop can be omitted and replaced by a switch that passes the test signal to the receiver during the test.

Testing is controlled by the control unit 111 which controls the transmitter and receiver frequencies, as well as the voltage-controlled oscillator 106 which generates the mixing frequency. The control unit also controls the switches 107 and 109 that are "closed" during the test. Additionally, the control unit may generate the test signal contents and analyze the test signal received by the receiver.

Figure 2:
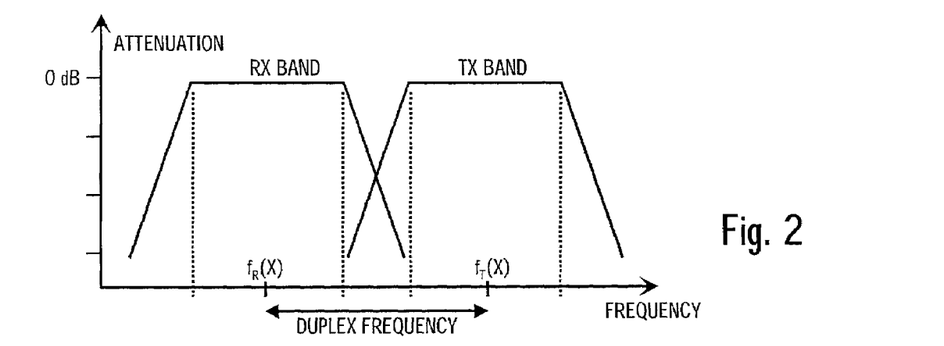
FIG. 2 shows transmission and reception frequency bands.

FIG. 2 shows the principle viewed at the frequency level. The figure depicts the transmission band TX and the reception band RX of a particular system. The band is divided into channels (not shown). When the transmitter generates the test signal on a channel using the transmission band TX frequency $f_T(x)$, the transmission frequency is converted into the reception bank RX frequency $f_R(x)$ by the mixer assembled on the test loop. Thus, the test signal travels within the transceiver unit. Preferably, the difference in transmission and reception frequencies is identical to the duplex range, but this is not necessary if the control unit controls the synthesizers independently of each other.

In the test procedure described above, part of the transmitter and receiver branch is included in the test loop.

Figure 3:
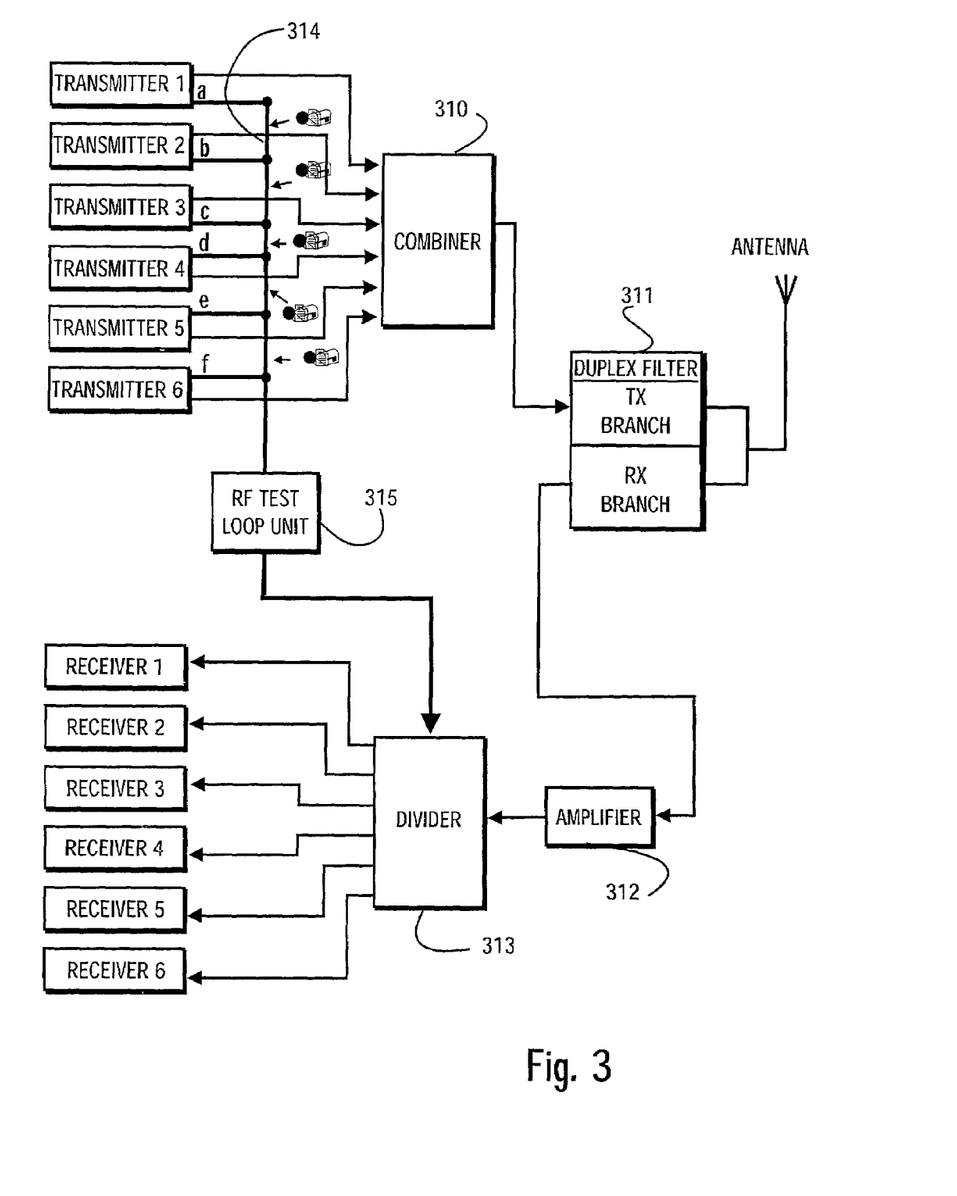
FIG. 3 shows another transceiver test loop circuit.

In U.S. Pat. No. 5,457,812, Siira et al. provide a description of testing using a separate test loop. The principle of this solution is shown in FIG. 3. The system depicted here could be a base station in a cellular network with several transceiver units, six in this instance. The transmitters are designated as Transmitter 1 through Transmitter 6 and the receivers in a similar fashion as Receiver 1 through Receiver 6. In normal operation, the radio signals from the transmitter outputs are combined by combiner 310 into a combined signal that is sent along the shared cable to the duplex filter 311 and further on to the antenna. The received signal is led from the antenna to the duplex filter 311, from where the sum signal is led to the reception branch, amplified by the amplifier 312 and finally divided by the wideband divider 313 for delivery to the individual receivers. Thus, all the frequencies are equally divided between all receivers and each receiver selects its own frequency by means of the mixer and narrow-band filter. This is a solution commonly known in prior art.

The correct operation of the transmitters and receivers in accordance with the said US patent is verified so that each transmitter has a separate output for the test signal. In FIG. 3, these outputs are denoted by references a through f. Each output has two output impedance modes: a low-impedance mode of approx. 50 Ω when the transmitter is transmitting the test signal and a high-impedance mode of approx. 10 kΩ when no test signal is being transmitted. The outputs are connected to the shared test cable 314 in such a way that the distance between the connection points of the test outputs of two adjacent transmitters on the shared cable is $\lambda/2$ or any multiple thereof. Thus, the distance between the connection points of the test outputs of transmitters 1 and 2 on the test cable is n●λ/2, that of the connection points of the test outputs of transmitters 2 and 3 n●λ/2, and so on. The test cable is connected to the loop unit 315 that carries out the frequency conversion.

The transmitters send their test signals one by one. The test output of the transmitting transmitter is in the low-impedance mode while the others are in the high-impedance mode. The non-transmitting transmitters connected to the test cable using the half-wave technology are visible to one another as practically infinite impedances, and so will not impose any load on one another. The only load that the loop unit 315 performing the frequency conversion is subjected to is the low impedance of the transmitting transmitter. Consequently, a single loop cable is enough and it is not necessary to use separate cables to connect the outputs of each transmitter to the loop unit 315, which would then have to include a combiner feature as well.

These prior-art transceiver test procedures have certain drawbacks. Solutions of the type shown in FIG. 1 require an extra synthesizer to generate the mixing frequency, a mixer stage, signal switching circuits such as directional couplers and switches to minimize the effect of testing on normal operation. Even if the transmitter and receiver used the same frequency, control switches would still be necessary. A synthesizer needs to be programmed to ensure that it operates on the right frequency and the switches have to be controlled as well. When a solution of the type shown in FIG. 1 is used in an environment where there are several transceiver units, not only a large number of cables, but also a large number of switches, mixers, and oscillators are required. The number of components can be reduced by employing the known solution shown in FIG. 3. Moreover, the test can only be carried out within a single transceiver unit (TRX), making it impossible to say whether it is the transmitter or the receiver that is defective.

A major problem with prior-art solutions is that they are only capable of testing the performance of the transmitter and receiver. They cannot be used for testing the correct operation of the duplex filter or even detecting if the filter is missing or if the cable connecting the transmitter and receiver to the filter is defective or completely missing.

A BRIEF SUMMARY OF THE INVENTION

One of the objectives of the present invention is to provide a test procedure that permits not only testing of the transceiver but also testing of the cable connecting the transmitters and receivers to the duplex filter and the filter itself.

Another objective of the invention is to provide a test procedure where the number of components required in the test circuit is as low as possible, preferably zero.

The invention is based on the idea of making use of the fact that the frequency response of the transmission branch duplex filter and that of the reception branch duplex filter partially overlap in the stop band. This makes it possible to use the same stop band frequency in test transmission and reception. The transmitter local oscillator will be adjusted to shift the carrier wave frequency of the transmitting signal in between the reception and transmission frequency bands in the system. The receiver local oscillator will be adjusted to shift the reception frequency in between the reception and transmission frequency bands onto the same frequency at which the transmitter frequency is set. The test signal will be sent and received on this frequency. This will generate, for the antenna, a transmission signal that is, having been attenuated in the TX filter section of the duplex filter, sufficiently weak to satisfy the antenna interface requirements, but still strong enough to remain above the sensitivity threshold of the receiver despite the attenuation in the RX filter section of the duplex filter.

In this way, the receiver receives the signal transmitter from its own transmitter. In its simplest form, the system requires no extra components as compared with normal transmission and reception operations.

BRIEF DESCRIPTION OF THE DRAWINGS

In the following, the invention is described in more detail with reference to the following schematic drawings, of which

DETAILED DESCRIPTION OF THE INVENTION

Figure 4:
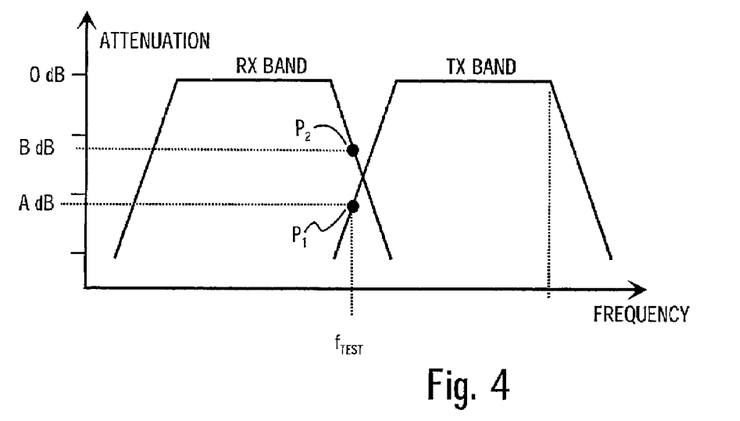
FIG. 4 shows the idea of the invention viewed at the frequency level.

The idea of the invention is clearly illustrated in FIG. 4. The invention is based on the fact that in systems where the transmission band TX and the reception band RX, limited by the duplex filter, are sufficiently close to each other to partially overlap in the stop band, it is possible to find a transmission frequency for sending a signal that passes through the transmission filter section of the duplex filter and the reception filter section of the duplex filter. The test signal is transmitted at such an output that even if it is attenuated by both the filters, it will still exceed the sensitivity threshold of the receiver and can thus be detected. For the sake of clarity, it should be pointed out that the duplex filter consists of two separate band pass filters, namely a transmission branch filter and a reception branch filter.

First Embodiment of the Invention

Figure 5:
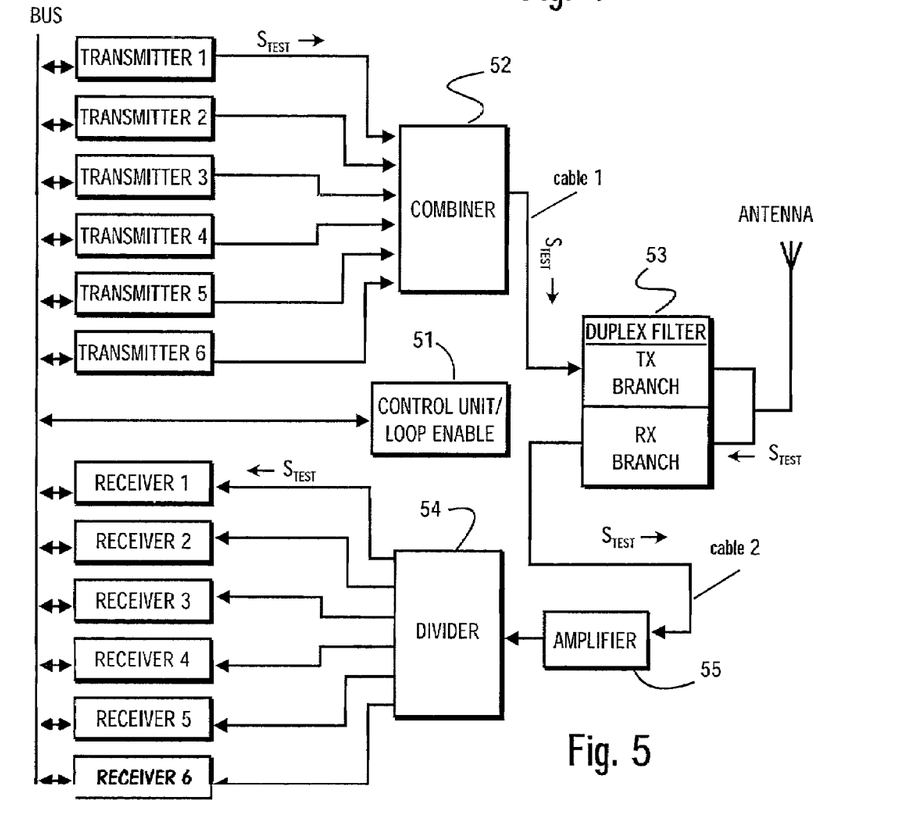
FIG. 5 shows an arrangement with several transceiver units.

The sequence of events in the proposed procedure is explained in more detail with reference to FIGS. 4 and 5. FIG. 5 is basically similar to FIG. 3, so that operation of the solution in its conventional form is obvious to a professional in the field.

Let us assume that the control unit 51 initiating the test will check the performance of transmitter 1 and receiver 1 and their inter-connecting loop that includes a cable connecting the combiner 52 in the transmission branch to the TX filter section of the duplex filter 53, and a cable connecting the RX filter section of the duplex filter 53 to the divider 54, as well as the duplex filter itself. Let us further assume that the combiner is of the wideband type, such as a component based on the Wilkinson divider, in which case it will not essentially attenuate the test signal frequency.

The control unit sends to the transmitter 1 and receiver 1 synthesizers a control signal to tune them to the test signal frequency $f_{TEST}$. This frequency is located between the transmission and reception band (see FIG. 4) in a region where the filter stop bands partially overlap. First, transmitter 1 sends a relatively weak test signal $S_{TEST}$ containing a certain bit pattern on frequency $f_{TEST}$. The test signal passes through the wideband combiner 52 to cable 1 and further on to the TX filter branch of the duplex filter. The TX filter strongly attenuates the signal in accordance with the filter's attenuation curve because the signal frequency is within the TX band stop band, point P1. Thus, the signal obtained from the filter output is the dB-attenuated test signal $S_{TEST}$. Part of its output is directed to the antenna and part to the RX filter branch of the duplex filter 53. Because the test signal is within the stop band of the RX filter (see FIG. 4) the test signal is further attenuated, point P2, meaning that the test signal $S_{TEST}$ reaching the reception branch cable 2 is highly attenuated. From there it proceeds via the divider 54 to the receiver 1.

The output power and frequency of the test signal to be transmitted are selected in consideration of the attenuation caused by the duplex filter. The output power must be low enough to ensure that the signal attenuated in the TX filter section of the duplex filter satisfies the antenna interface requirements but, at the same time, high enough to ensure that it remains above the sensitivity threshold of the receiver when attenuated in the RX filter section of the duplex filter.

Using the proposed testing method on a base station is presented by way of a numeric example. The numeric example concerns e.g. GSM mobile communications system. The transmitter's output power is adjusted so that, for example, the $S_{TEST}$ signal power is +20 dBm while the transmission frequency $f_{TEST}$ is selected to ensure that attenuation in the TX filter of the duplex filter is 70 dB. Then, the output level of the test transmission frequency at the antenna is −50 dBm, which is less that the −36 dBm required in GSM specifications. In this case, the RX filter of the duplex filter may cause a 20-dB attenuation, which will give a signal level of −70 dBm at the receiver, meaning the reception is successful without problems.

By making use of the properties of the duplex filter as described above, it is possible to form a test loop that includes all the components and signal paths via which the transmission and reception proceeds in normal operation. A failure or deficient operation of even one single component can be inferred from the received signal.

In the example given above, transmitter 1 transmitted the test signal that was received by receiver 1. However, the test can also be carried out using one transmitter and several receivers simultaneously. This will give more accurate information on the location of any defect.

For example, if the test signal is transmitted by transmitter 1 and it is received by all receivers, we know that even if one receiver receives the signal correctly, transmitter 1 is in order whereas those receivers that received the signal incorrectly are malfunctioning. Conversely, if none of the receivers receives the message correctly, the fault may lie in transmitter 1, the combiner 52, the cables, the duplex filter 53, the amplifier 55, the divider 54 or in all the receivers simultaneously. By sending the test signal from individual transmitters one by one, it is possible to identify the defective transmitter, if at least one transmitter and one receiver are working and the fault does not lie in the combiner, the cables, the duplex filter, the filter, the antenna amplifier or the divider.

A solution in accordance with FIG. 5 does not require any additional components. Its practical implementation is cheap and simple and does not require any space or extra power. One drawback is a potential, but probably highly uncommon, fault that is not detected, such as a fall in the transmitter output power at the end that is farthest away from the transmission band.

However, additional components are required if the combiner is of the narrow-band type. The pass band in one of the branches of such a combiner whose operation is based on filters is only slightly wider than the modulation bandwidth; for example, in the GSM system, the pass band is a little over 200 kHz. Usually, the medium frequency of the pass band of the filter in each branch is motor-adjusted to the medium frequency of the transmitter connected to the branch. Such a narrow-band combiner will not pass the test signal frequency through itself.

Figure 6:
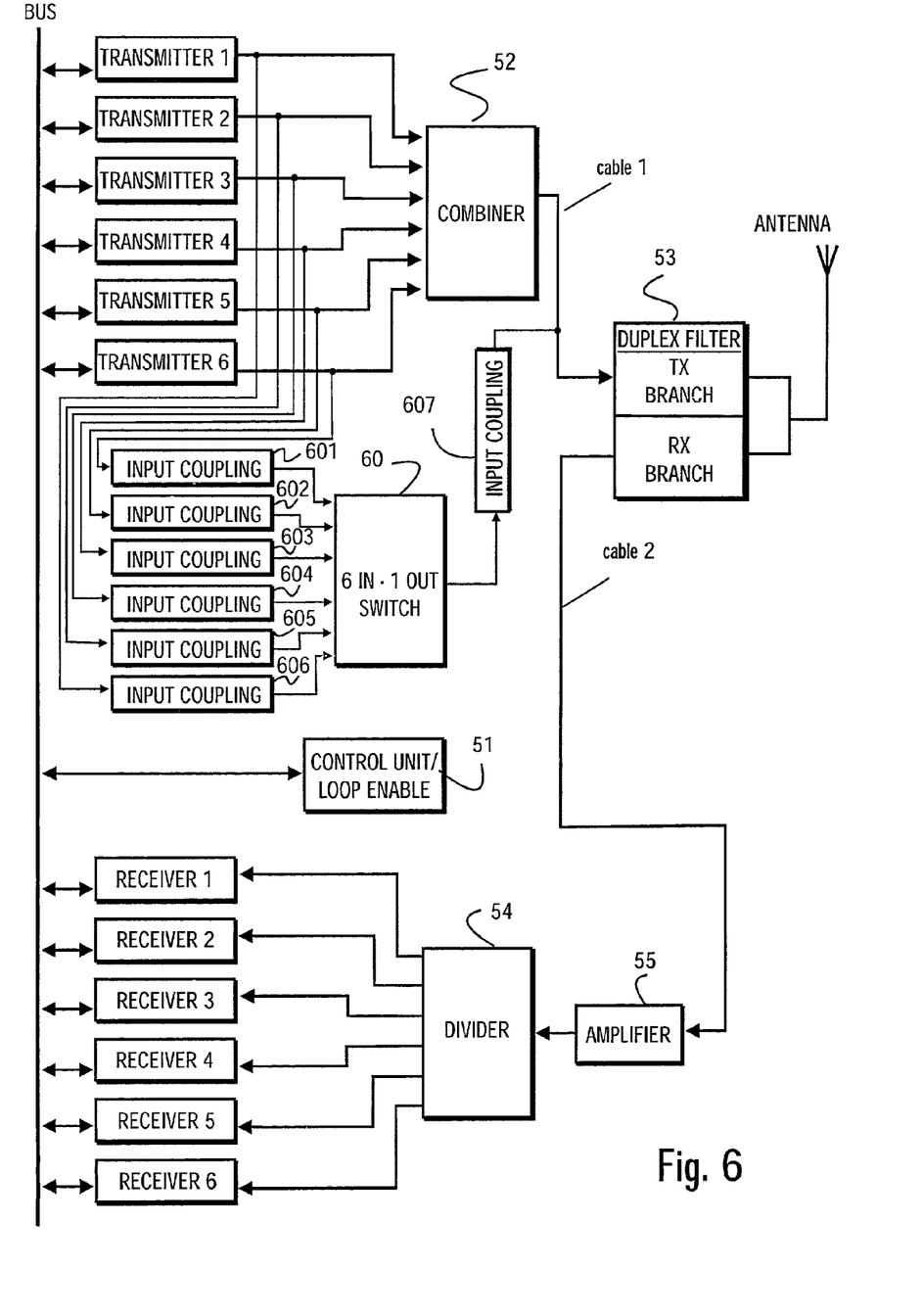
FIG. 6 shows a combiner by-pass.

FIG. 6 shows the necessary arrangements in the case of a narrow-band combiner. Where applicable, the reference numbers used in the figure are identical to those in FIG. 5. Because the combiner 53 is a narrow-band device and does not pass through itself the test signal frequency, it will be by-passed with the switch 60. As such, the switch involved is a known N in 1 out switch, and in this case any input can be connected to the output. The switch, such as any of the directional couplers 601 through 606, located at the output line of each transmitter, can be used to route the output signal to the appropriate input of the switch 60. Then, if the control unit 51 aspires to order transmitter 1 to send a test signal, it will connect the directional coupler 606 to an output on the switch 60. Then the test signal will pass to the duplex filter through the directional couple 606, the switch 60 and the directional coupler 607. The last-mentioned coupler is preferably connected to the end of the cable 1 that is closest to the combiner 52, which makes it possible to test the cable as well. Actual testing is carried out as described in connection with FIG. 5, the only difference being that the combiner 52 is by-passed by the parallel switch 60.

The implementations described above are simple because no additional components are required except in the case of a narrow-band combiner. If the attenuation caused by the filters is sufficiently stable on the test frequency used, it is possible to check the performance of the transmitter and receiver amplifying stages by measuring the strength of the signal received by the receiver.

If filter attenuation on the test frequency is irregular, i.e. it cannot be stored for future reference, the basic idea of the invention can be realized using the following connections.

Second Embodiment of the Invention

Figure 7:
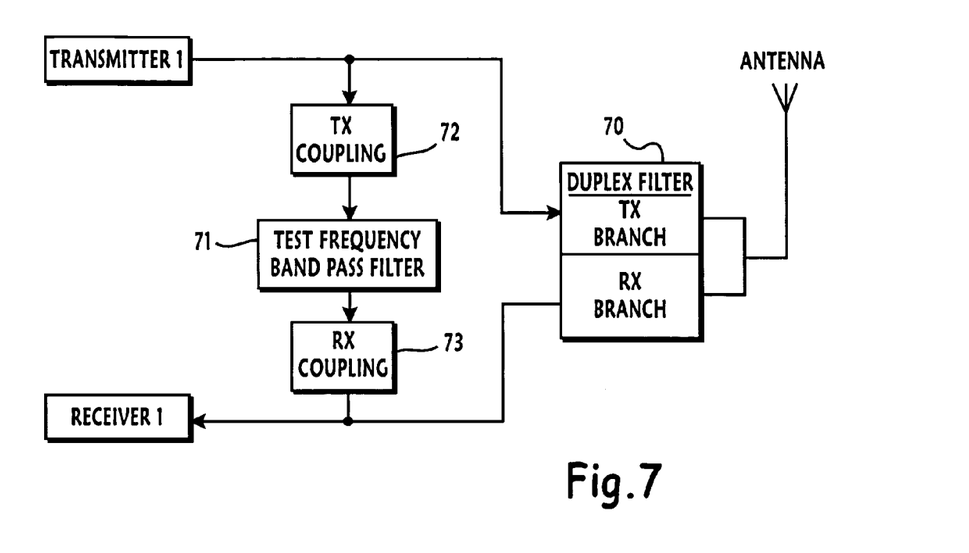
FIG. 7 shows a second embodiment of the invention.

The solution presented in FIG. 7 is based on controlled attenuation on the test frequency. In this case, a test filter 71 is connected between the transmitter and receiver branches using the TX coupling 72 and the RX coupling 73. The couplings may be directional couplers. Thus, the test loop consists of the transmitter 1, the TX coupling 72, the band pass filter 71, the RX coupling 73, and a receiver.

Attenuation provided by the TX and RX filter sections of the duplex must, on the test frequency, be greater than attenuation by the loop used for testing to ensure that most of the test signal will pass through the filter 71. Similarly, attenuation by the loop used for testing should be much greater outside the test frequency than attenuation by the duplex filter to ensure that the test loop does not impair system performance during normal operation. Otherwise, the attenuation on the reception band in the TX branch of the duplex filter is e.g. 80 dB (in normal operation), attenuation on the test loop should be about 10 dB higher on the same band, i.e. about 90 dB. If minimum attenuation on the test band in the TX and RX branches of the duplex filter is 70 dB, attenuation on the test loop should be about 10 dB lower i.e. 60 dB.

In the case presented in the previous example, the TX and RX coupling level could be −30 dB and the test filter attenuation on the test frequency −2 dB. Then, test loop attenuation on the test frequency would be =62 dB and duplex filter attenuation at least −70 dB, therefore most of the test signal would pass through the test loop. Similarly, if the RX and TX band attenuation in the test filter is 30 dB, the test loop does not have much effect; instead, the transmission signal will proceed to the duplex filter and it will be correctly received by the receiver.

The test loop can be integrated within the duplex filter. If so, it is also possible to check the performance of the cables connecting the duplex filter to the transmitter and the duplex filter to the receiver and to verify that the duplex filter is properly connected. However, the test will not reveal anything of the condition of the TX and RX branches of the duplex filter.

Figure 8:
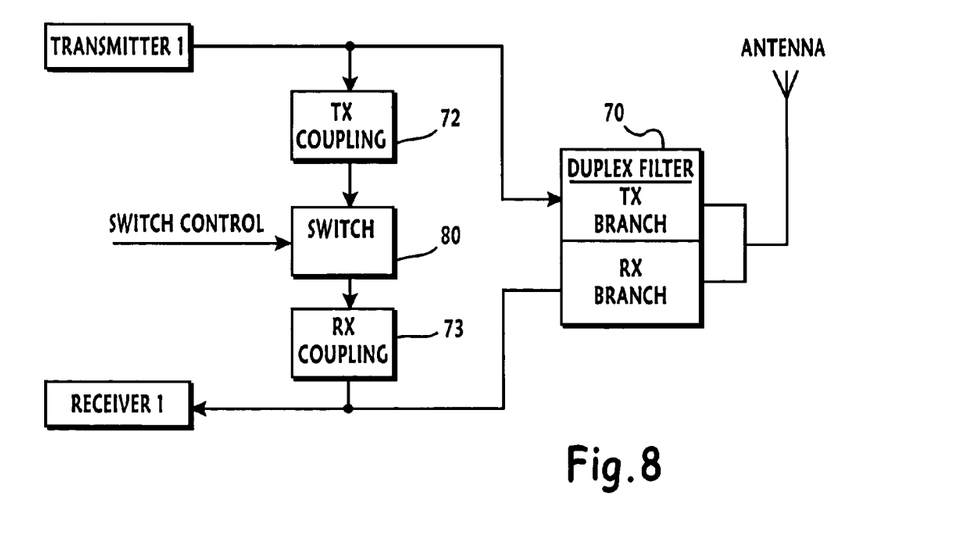
FIG. 8 shows a variation of the second embodiment of the invention.

The optional implementation shown in FIG. 8 is also based on controlled attenuation except that test attenuation is activated only for the duration of the test by closing the switch 80 using a switch control, which will enable the signal to pass directly from the transmitter branch to the receiver branch. During the test, the duplex filter attenuation must be greater than the attenuation provided by the loop used for testing. Similarly, attenuation by the loop used for testing should be greater during normal operation to ensure that the test loop path does not impair system performance. For example, if attenuation on the RX band in the TX branch of the duplex filter is 80 dB (in normal operation), attenuation on the test loop should be about 10 dB higher on the same band, i.e. about 90 dB. If minimum attenuation on the test band in the TX and RX branches of the duplex filter is 70 dB, attenuation on the test loop should be about 10 dB lower on the same band i.e. 60 dB.

In the case presented in the example, the TX and RX coupling level could be −30 dB and the switch attenuation on the test frequency −2 dB. Then, the test loop attenuation on the test frequency would be −62 dB and duplex filter attenuation at least −70 dB, meaning that attenuation by the duplex filter is high and most of the test signal would pass through the test loop. Similarly, if attenuation of the switch 80 on the RX band in the switch is 30 dB, the test loop does not have much effect on total system attenuation. If the test loop is integrated within the duplex filter, it is also possible to check the performance of the cables connecting the duplex filter to the transmitter and the duplex filter to the receiver and to verify that the duplex filter is properly connected. However, the test will not reveal anything of the condition of the actual duplex filter or the TX and RX branch filters.

In the foregoing, a few potential implementations of the invention have been described. It is obvious to a person skilled in the art that the patent claims permit a number of other embodiments as well.

The invention claimed is:

1. A method for testing the radio transceiver in a system where the transmission signal pass band, limited by the transmission branch filter of a duplex filter, and the reception signal pass band, limited by the reception branch filter, are adjacent so that the frequency response curves of said filters partially overlap at the stop band between the pass bands, comprising the steps of:

arranging a test loop between the transmission branch and the reception branch, wherein the test loop includes a TX coupling, a band pass filter, and a RX coupling, the test loop having essentially less attenuation on the test frequency than the duplex filter and thus a test signal proceeds via the test loop from the transmitter to the receiver, adjusting a transmitter local oscillator of the transmitter for tuning the transmitter's transmission frequency away from the transmission signal pass band to a test frequency that falls into the stop band of the transmission branch filter frequency response curve and the reception branch filter frequency response curve, adjusting a receiver local oscillator of the receiver for tuning the receiver reception frequency to the test frequency, transmitting the test signal, and receiving the test signal which has been attenuated while passing through the test loop.

2. A method for testing the radio transceiver in a system where the transmission signal pass band, limited by the transmission branch filter of a duplex filter, and the reception signal pass band, limited by the reception branch filter, are adjacent such that the frequency response curves of said filters partially overlap at the stop band between the pass bands, comprising the steps of:

arranging a test loop between the transmission branch and the reception branch, wherein the test loop includes a TX coupling, a switch, and a RX coupling, the test loop having essentially less attenuation on the test frequency than the duplex filter and thus a test signal proceeds via the test loop from the transmitter to the receiver when the switch having been closed by a switch control, adjusting a transmitter local oscillator of the transmitter for tuning the transmitter's transmission frequency away from the transmission signal pass band to a test frequency that falls into the stop band of the transmission branch filter frequency response curve and the reception branch filter frequency response curve, adjusting a receiver local oscillator of the receiver for tuning the receiver reception frequency to the test frequency, transmitting the test signal, and receiving the test signal which has been attenuated while passing through the test loop.

3. A method for testing a unit comprising several radio transceivers in a system where the transmission signals are combined by a combiner into a sum signal and transmitted to the duplex filter, and the received sum signal containing various frequencies is routed from the duplex filter to a divider that splits the signal containing different frequencies to be delivered to its receiver, the pass band for the system transmission signal frequencies limited by the duplex filer transmission branch filter and the pass band for the system reception signal frequencies limited by the duplex filter reception branch filter are adjacent so that the filter frequency response curves partially overlap at the stop band between the pass bands, comprising the steps of:

arranging a test loop between the transmission branch and the reception branch, wherein the test loop includes a TX coupling, a band pass filter, and a RX coupling, the test loop having essentially less attenuation on the test frequency than the duplex filter and thus a test signal proceeds via the test loop from the transmitter to the receiver, adjusting a transmitter local oscillator of the transmitter for tuning the transmitter's transmission frequency away from the transmission signal pass band to a test frequency that falls into the stop band of the transmission branch filter frequency response curve and the reception branch filter frequency response curve, adjusting a receiver local oscillator of the receiver for tuning the receiver reception frequency to the test frequency, transmitting the test signal, and receiving the test signal which has been attenuated while passing through the test loop.

4. A method for testing a unit comprising several radio transceivers in a system where the transmission signals are combined by a combiner into a sum signal and transmitted to the duplex filter, and the received sum signal containing various frequencies is routed from the duplex filter to a divider that splits the signal containing different frequencies to be delivered to its receiver, the pass band for the system transmission signal frequencies limited by the duplex filer transmission branch filter and the pass band for the system reception signal frequencies limited by the duplex filter reception branch filter are adjacent so that the filter frequency response partially overlap curves at the stop band between the pass bands, comprising the steps of:

arranging a test loop between the transmission branch and the reception branch, wherein the test loop includes a TX coupling, a switch, and a RX coupling, the test loop having essentially less attenuation on the test frequency than the duplex filter and thus a test signal proceeds via the test loop from the transmitter to the receiver when the switch having been closed by a switch control, adjusting a transmitter local oscillator of the transmitter for tuning the transmitter's transmission frequency away from the transmission signal pass band to a test frequency that falls into the stop band of the transmission branch filter frequency response curve and the reception branch filter frequency response curve, adjusting a receiver local oscillator of the transmitter for tuning the receiver reception frequency to the test frequency, transmitting the test signal, and receiving the test signal which has been attenuated while passing through the test loop.

5. A method in accordance with claim 3, wherein the reception frequency of each receiver is tuned to the test frequency, the test signal is transmitted by one transmitter, the test signal is received by each receiver, and if at least one receiver receives the test signal correctly, it is assumed that a receiver receiving the test signal incorrectly is defective.

6. A method in accordance with claim 3, wherein the test signal is sent by the transmitters one by one, the test signal is received by several receivers, it is inferred that the transmitter being tested is defective if at least one receiver has received the test signal sent by any other transmitter correctly and the transmitter being tested has received the test signal sent incorrectly or not at all.

7. A method in accordance with claim 3, wherein the test signal is sent by each transmitter one by one, the test signal is received by several receivers, it is inferred that the test loop between the transmitters and receivers is defective, if none of the receivers receives a signal sent on the test signal frequency.

8. A system for testing the radio transceiver, the system comprising:

a transmission branch consisting of a functionally inter connected transmitter and duplex filter and a reception branch consisting of a functionally inter-connected receiver and duplex filter, with the duplex filter limiting a transmission signal pass band and a reception signal pass band, the transmitter having a transmitter local oscillator and the receiver having a receiver local oscillator, a test control tuning the transmitter local oscillator and the receiver local oscillator on the same test frequency as response to control and the transmitter sending a test signal, a test loop connected between the transmission branch and reception branch and including a TX coupling, a band pass filter and a RX coupling, the test loop causing an attenuation on the test frequency that is essentially lower than the attenuation caused by the duplex filter, which enables the test signal to proceed along the test loop from the transmitter to the receiver, and an attenuation on the transmission signal pass band and the reception signal pass band limited by the duplex filter essentially higher than the attenuation caused by the duplex filter, which enables the transmission signal to proceed from the transmitter to the duplex filter and on to an antenna.

9. A system for testing a radio transceiver, the system comprising:

a transmission branch consisting of a functionally inter connected transmitter and duplex filter and a reception branch consisting of a functionally inter-connected receiver and duplex filter, with the duplex filter limiting a transmission signal pass band and a reception signal pass band, the transmitter having a transmitter local oscillator and the receiver having a receiver local oscillator, a test control tuning the transmitter local oscillator and the receiver local oscillator on the same test frequency as response to control and the transmitter sending a test signal, a test loop connected between the transmission branch and reception branch and includes a TX coupling, a switch and a RX coupling, the test loop with the switch closed causing an attenuation on the test frequency that is essentially lower than the attenuation caused by the duplex filter enabling the test signal to proceed along the test loop from the transmitter to the receiver and the test loop with the switch open causing an attenuation on the transmission signal pass band and the reception signal pass band limited by the duplex filter being essentially higher than the attenuation caused by the duplex filter enabling the transmission signal to proceed from the transmitter to the duplex filter and on to an antenna.

10. A system in accordance with claim 8, wherein that the test frequency is outside the range of the transmission signal pass band of the duplex filter.

11. A system in accordance with claim 8, wherein that the test filter is integrated within the duplex filter, in which case the test loop also includes the cabling between the transmitter and the duplex filter and the cabling between the duplex filter.

12. A radio transceiver comprising:

a transmission branch including a transmitter having a transmitter local oscillator tunable to a test frequency outside a transmission signal pass band;

a reception branch including a receiver having a receiver local oscillator tunable to the test frequency outside a reception signal pass band;

a duplex filter connected to the transmission branch and the reception branch, the duplex filter limiting the transmission signal pass band and the reception signal pass band; and a test loop connected between the transmission branch and the reception branch and including a TX coupling, a band pass filter and a RX coupling, the test loop causing on the test frequency an attenuation essentially lower than the attenuation caused by the duplex filter, enabling a test signal on the test frequency to proceed along the test loop from the transmitter to the receiver, and on the transmission signal pass band and the reception signal pass band an attenuation essentially higher than the attenuation caused by the duplex filter, enabling a signal on the transmission signal pass band to proceed from the transmitter to the duplex filter and on to an antenna, wherein the radio transceiver is configured to adjust the transmitter local oscillator and the receiver local oscillator on the same test frequency and to cause the transmitter to send the test signal.

13. A radio transceiver comprising:
a transmission branch including a transmitter having a transmitter local oscillator tunable to a test frequency outside a transmission signal pass band;
a reception branch including a receiver having a receiver local oscillator tunable to the test frequency outside a reception signal pass band;
a duplex filter connected to the transmission branch and the reception branch, the duplex filter limiting the transmission signal pass band and the reception signal pass band; and
a test loop connected between the transmission branch and the reception branch and including a TX coupling, a switch and a RX coupling, the test loop with the switch closed causing at least on the test frequency an attenuation essentially lower than the attenuation of the duplex filter enabling a test signal on the test frequency to proceed along the test loop from the transmitter to the receiver, the test loop with the switch open causing at least on the transmission signal pass band an attenuation essentially higher than the attenuation of the duplex filter enabling a transmission signal to proceed from the transmitter to the duplex filter and on to an antenna,
wherein the radio transceiver is configured to adjust the transmitter local oscillator and the receiver local oscillator on a same test frequency and to cause the transmitter to send the test signal.

* * * * *